Sept. 1, 1942.    O. C. FUNDERBURK    2,294,743
FUEL SUPPLY, CARBURETION, AND SUPERCHARGER SYSTEM AND
APPARATUS FOR INTERNAL COMBUSTION ENGINES
Filed Sept. 11, 1940    4 Sheets-Sheet 1

INVENTOR
Otis C. Funderburk
BY
Braselton, Whitcomb & Davies
ATTORNEYS

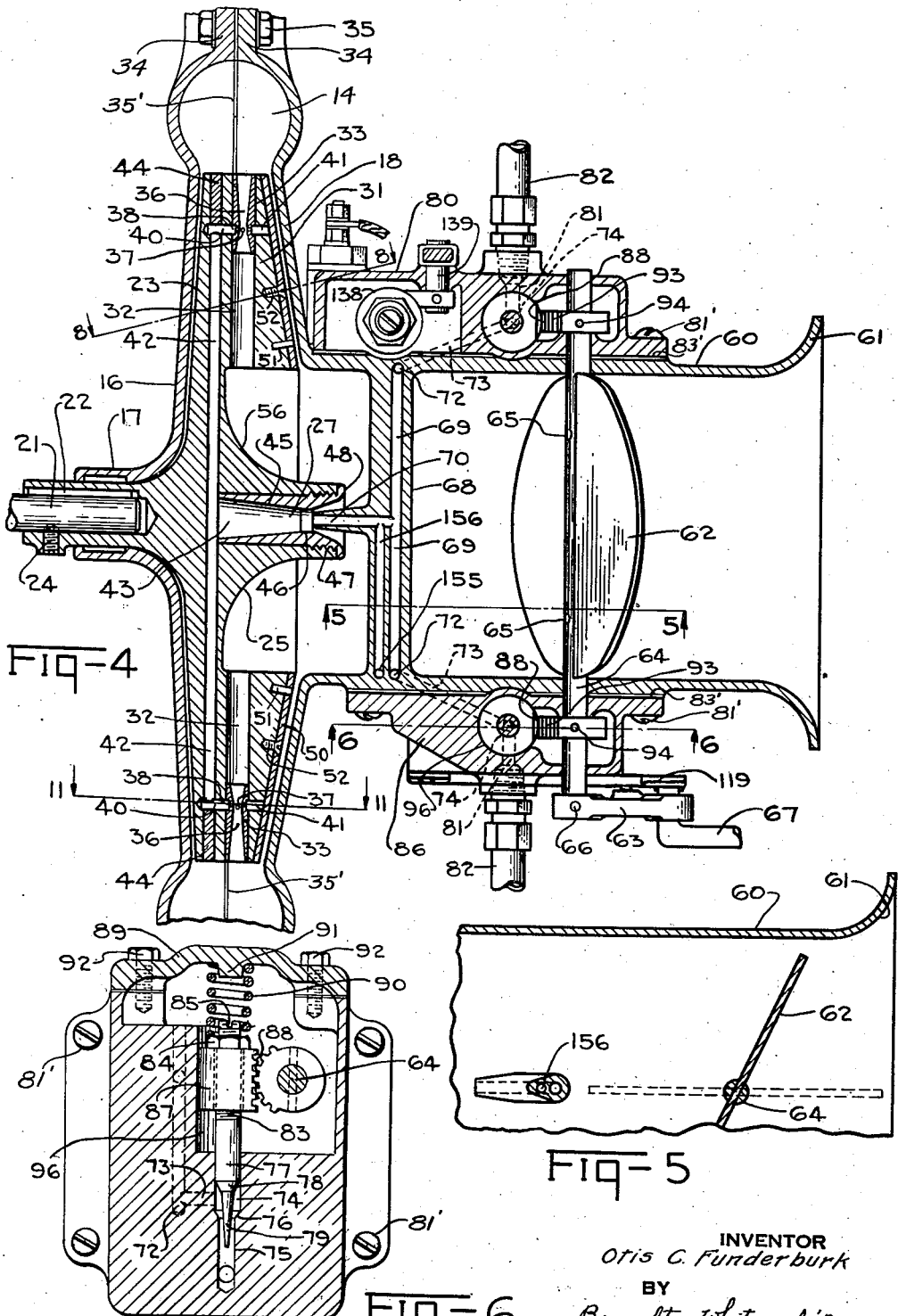

Sept. 1, 1942.   O. C. FUNDERBURK   2,294,743
FUEL SUPPLY, CARBURETION, AND SUPERCHARGER SYSTEM AND
APPARATUS FOR INTERNAL COMBUSTION ENGINES
Filed Sept. 11, 1940   4 Sheets-Sheet 3

INVENTOR
Otis C. Funderburk
BY
Braselton, Whitcomb Davies
ATTORNEYS

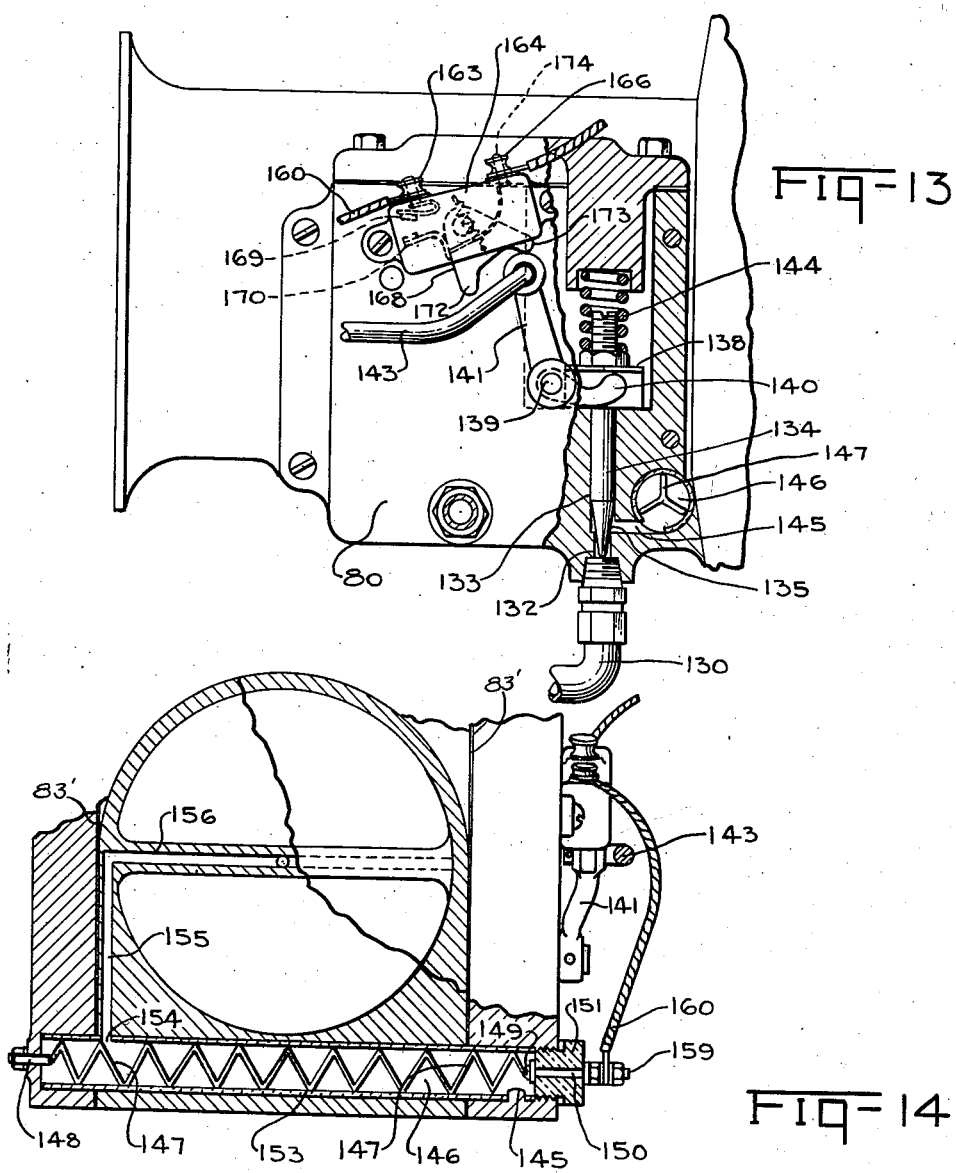

Patented Sept. 1, 1942

2,294,743

UNITED STATES PATENT OFFICE 2,294,743

FUEL SUPPLY, CARBURETION, AND SUPER-
CHARGER SYSTEM AND APPARATUS FOR
INTERNAL COMBUSTION ENGINES

Otis C. Funderburk, Weston, Mass.

Application September 11, 1940, Serial No. 356,364

8 Claims. (Cl. 261—85)

This invention relates to an apparatus for producing a combustible mixture and more particularly to mechanical means for elevating fuel, mixing and distributing air and fuel constituents to produce a combustible mixture particularly suitable for internal combustion engines.

The invention is inclusive of a system for mixing, conducting and delivering a mixture of air and fuel constituents from a common source of supply by rotatable means to a collecting zone or outlet.

The invention comprehends the provision of rotatable means for feeding to a suitable chamber and mixing a liquid fuel with air in a proper relation to secure a combustible mixture satisfactory for multi-cylinder internal combustion engines.

The invention has for one of its objects the provision of a plurality of rotatable Venturi tubes for effecting the atomizing and mixing of liquid fuel with the air in a ratio to secure a combustible mixture having an air and fuel ratio which is substantially constant irrespective of atmospheric pressure or temperature.

The invention has for another object the utilization of rotatable means for securing uniformity of a mixture formation and distribution by employing liquid fuels and of mixing fuel and air in successive stages.

The invention has for another object the provision of mechanical means to atomize various types of liquid fuels and especially heavy fuels including those not readily susceptible to atomization by conventional means.

The invention has for another of its objects the provision of atomizing means usable with an anterior air control throttle and fuel metering means operating in conjoint relationship and dependent for simultaneous functioning upon the rate of actuation of the atomizing means.

Another object of the invention is to provide centrifugal means arranged to conjointly feed, atomize, mix and distribute a fuel and air mixture for an internal combustion engine.

Another primary object of the invention is to provide an aspirator in association with an engine manifold for producing a flow and efficient carburetion of a liquid fluid under pressure to form a combustible mixture of uniform character under the most adverse conditions of engine operation.

A further general object of this invention is to provide an aspirator for mixing air and liquid fuel in a predetermined ratio by a centrifugal action and distributing the mixture under pressure to an engine manifold.

Still another object is the provision of simple and effective means for heating fuel during initial or starting operations of the internal combustion engine.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which Figure 1 is a view showing a portion of a conventional radial cylinder type aviation engine incorporating the arrangement of my invention;

Figure 4 is a horizontal sectional view taken substantially on the line 4—4 of Figure 1;

Figure 5 is a sectional view taken substantially on the line 5—5 of Figure 4;

Figure 6 is a fragmentary vertical sectional view taken substantially on the line 6—6 of Figure 4;

Figure 13 is a side elevational view showing the supplemental fuel supply and heating means therefor;

Figure 14 is an end view partly in section of the structure shown in Figure 13.

Figure 1:
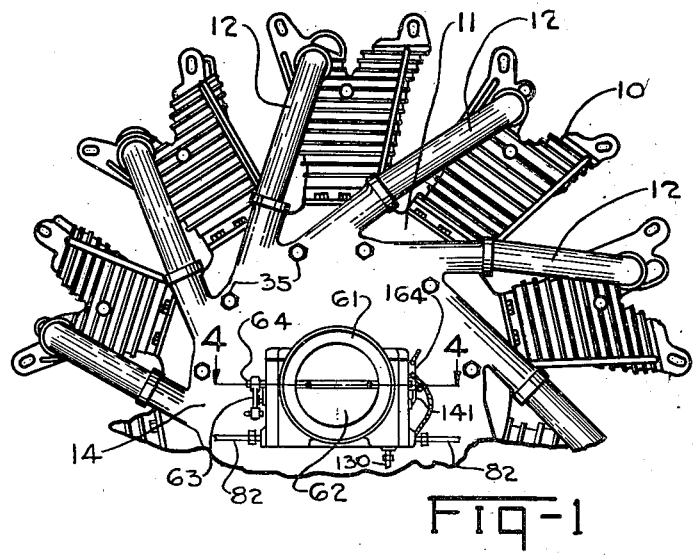

Referring to the drawings in detail, there is illustrated a portion of an aviation engine of conventional design in which numeral 10 illustrates the radially disposed engine cylinders which are secured to a crankcase 11 centrally positioned with respect to the cylinders. Leading to each cylinder and radially positioned are intake manifolds 12, the inner ends being in communication with an annular fuel mixture distributing chamber 14.

The arrangement of my invention for feeding, mixing and delivering a fuel mixture to the engine is inclusive of a casing or housing preferably formed in two members including a disc-like member 16 having a hub portion 17, and a hollow member 18. Extending into the hub portion 17 of member 16 forming a part of the housing is a shaft 21 journalled for rotation in a manner to be hereinafter described. The housing members 16 and 18 are formed with peripheral flanges 34 and 34' adjacent the distributing chamber 14 which are secured together by means of bolts 35 or other suitable securing means, gasket 35' being interposed between the housing members to form a sealed joint.

Figure 9:
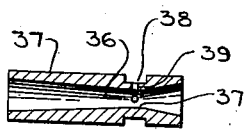
Figure 9 is a fragmentary view illustrating one of the radially arranged venturis of the rotor structure.
Figure 10:
Figure 10 is an end view of the Venturi construction shown in Figure 9.
Figure 11:
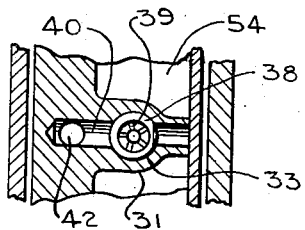
Figure 11 is a fragmentary sectional view taken substantially on the line 11—11 of Figure 4.

Fixedly secured on the shaft 21 is a disc-like element or rotor 23 retained on the shaft by a feather key 22 and set screw 24 or other suitable means. The rotor 23 is formed with a plurality of radially arranged bosses 31, substantially equally spaced about the inner face of the rotor. Each of the bosses 31 is bored or provided with a cylindrical passage 32 in the outer portion of which is fitted a bushing or fitting 33. Each bushing 33 is provided with a longitudinally extending venturi 36 having a restricted throat portion 37, each venturi being radially arranged in the rotor structure. The cylindrical exterior of the fitting 33 adjacent the throat portion of the venturi is provided with a circular groove 38. The groove 38 communicates with the throat 37 of the venturi by means of a plurality of spaced radially arranged openings or passages 39 as shown in Figures 9 and 10. The bosses 31 of the rotor 23 are each provided with a short transverse passageway 40, each passageway communicating with a groove 38 in each of the fittings 33 as particularly illustrated in Figures 4 and 11. The fittings 33 are held in place by means of pins 41 extending into openings in the rotor 23, the ends of the pins projecting into grooves 38 diametrically opposite the passageways 40. The passageways 40 are in communication with radially arranged passages 42 diametrically arranged in the rotor 23, passages 42 being in communication with the chamber 43, formed by the inner walls 45 of a venturi 27. The passages 42 are drilled or bored in the rotor and have their extremities closed by means of snugly fitting pins 44.

The hub portion 25 of the rotor 23 is provided with a venturi 27 arranged axially of the rotor which is formed with a restricted throat 46, the exterior of the fitting being threaded as at 47 into a threaded bore in the hub 25 of the rotor, the fitting also being provided with a flange 48 for properly positioning the Venturi fitting in the rotor. Secured to the rotor is an annular closure or plate 50 which is positioned on the rotor by means of dowels or pins 51 and is secured to the rotor by means of screws 52 or other suitable means. The spaces 54 formed between the inner walls of rotor 23, closure plate 50 and bosses 31 provide air passages radially arranged in the rotor structure for a purpose to be hereinafter explained. It is to be noted that the hub structure 25 of the rotor is formed with curved exterior surface 56 leading to the air passages 54 to facilitate the deflection of air flow axially of the hub structure to an air flow radially of the rotor.

The housing member 18 is formed with a generally cylindrical extension 60 forming an air passage which is preferably provided with a flaring inlet 61, a circular disk 62 being positioned in the air passage and functioning as an air regulating or throttle valve. The valve or disk 62, in the embodiment illustrated, is arranged in a slot formed in a shaft 64 which is journalled in the casing wall. Valve disk 62 is pinned to the shaft 64 by means of pins 65 or other suitable securing means. The shaft 64 extends exteriorly of the casing 60 and carries at one extremity an arm 63 held in place by a pin 66 which is connected by a rod 67 to the conventional throttle actuating means (not shown).

Formed in the extension 60 of casing member 18 and extending diametrically across the air inlet 61 is a hollow tubular portion 68 which is provided with a fuel passageway 69 in communication with a fuel outlet jet or nozzle 70, the terminus of the jet being arranged axially in the throat 46 of the venturi 27 so that a maximum "lift" upon the fuel supply is obtained by the action of air moving through the venturi 27. It should be noted that the configuration of the portion 68 is streamlined as shown in Figure 5 to facilitate rapid air flow past the portion 68 with a minimum of obstruction in the air passages. The fuel passageway 69 at each end is in communication with a passage 72 the latter in turn communicating with a passage 73, each passage 73 terminating in a bore or passage 74 arranged at each side of the air inlet as shown in Figure 4. The bore 74 communicates at its lower end with a bore 75 of smaller diameter, the wall of the connecting portion between passages 74 and 75 being frusto-conical in configuration forming a valve seat 76. Positioned in each of the passages 74 and 75 is a valve body or shaft 77 having a valve portion 78 arranged to cooperate with seat 76 to cut off the flow of fuel. The valve construction is also inclusive of a long tapering needle type valve 79 which extends into the small bore 75, and as the valve body 77 is elevated the air control disk or valve 62 is opened during operation of the device of my invention, the elevated needle 79 permits more fuel to flow into the air stream. Each of the passages 74 communicates with a fuel inlet 81 which registers with a supply tube 82 which is directly connected to the fuel supply tank (not shown).

Each valve shaft 77 is threaded as at 83 to threadedly receive a sleeve 87 which is provided with a flattened portion upon which are formed a series of teeth 88 forming a rack in mesh with a toothed sector 93. Also threaded upon the upper portion of shaft 77 is a nut 84, the upper end of the shaft having a slot 85. Each of the valve housings 80 and 86 is secured to housing 18 by means of screws 81', there being gaskets 83' interposed between the valve housings and the main casing 18. The upper portions of each of the valve housings 80 and 86 are closed by means of removable caps 89 secured in place by means of screws 92. This cap has an inwardly extending projection 91 which positions an expansive coil spring 90 arranged between the nut 84 and the wall of cap 89, spring 90 urging the valve shaft under light pressure toward valve closing position, the spring taking up any looseness or "back lash" between the teeth of sleeve 87 and sector 93. The adjustment of the fuel metering valve for idling position is accomplished by releasing nut 84, and by inserting a proper tool in slot 85, the valve shaft 77 may be rotated to raise or lower the same depending upon the amount of valve opening desired for the passage of fuel during idling conditions. The flattened portion of the sleeve 87 is engagement with teeth of sector 93 prevents the sleeve from rotating during the adjustment of shaft 77. After this adjustment has been made, the nut 84 may be tightened into engagement with sleeve or rack 87 to hold the sleeve and shaft 77 in fixed relationship. It is to be noted that the sleeve 87 is snugly seated in a cylindrical bore 96, which serves as additional means for properly guiding the valve shaft 77.

Each toothed sector 93 is mounted upon the throttle supporting shaft 64 and secured to the shaft by means of a pin 94 or other suitable securing means. With particular reference to Figures 4 and 6, it is to be noted that when shaft 64 is rotated in a clockwise direction to open the air control valve 62, sector 93 rotates with the shaft causing the sector to elevate the sleeve 87 against the tension of spring 90, and elevate or open the fuel control valve to admit more fuel into the engine. By this means the fuel may be metered or proportioned to the volume of air passing to the rotor through the casing extension 60.

Figure 12:
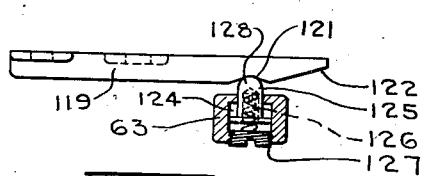
Figure 12 is a fragmentary sectional view illustrating a throttle control arrangement forming part of the invention.

In the arrangement of my invention as illustrated, it is desirable to have the throttle control arrangement of such a nature that when the engine is stopped, the fuel regulating valves 78 will be completely closed, i. e., resting on valve seats 76. It is also essential that the valve control embody a predetermined idling position for both the air control valve 62 and the fuel metering valves. To this end, there is secured to the exterior of one of the fuel valve casings 86, a quadrant or plate 119 held in place by screws 120 which is formed with a depression 121 and a surface 122 which is angularly disposed with respect to the major surface of the quadrant 119 as particularly shown in Figure 12. As shown in Figure 12, the throttle arm 63 is provided with a transverse bore 124 in which is slidably positioned the plunger 125 which is urged to its outermost position by means of a coil spring 126 the latter bearing against the inner end of threaded plug 127 which closes the bore 124. The extremity of plunger 125 is curved or rounded as at 128 to cooperate with the depression or recess 121 formed in quadrant plate 120.

Figure 2:
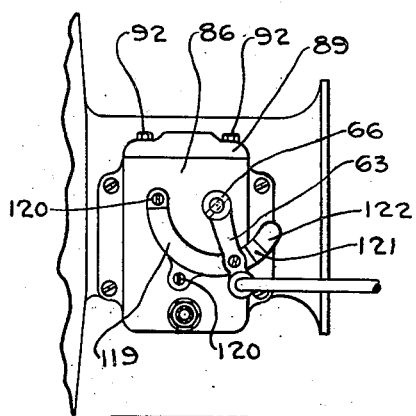
Figure 2 is a side elevational view of a portion of the housing structure shown in Figure 1.
Figure 7:
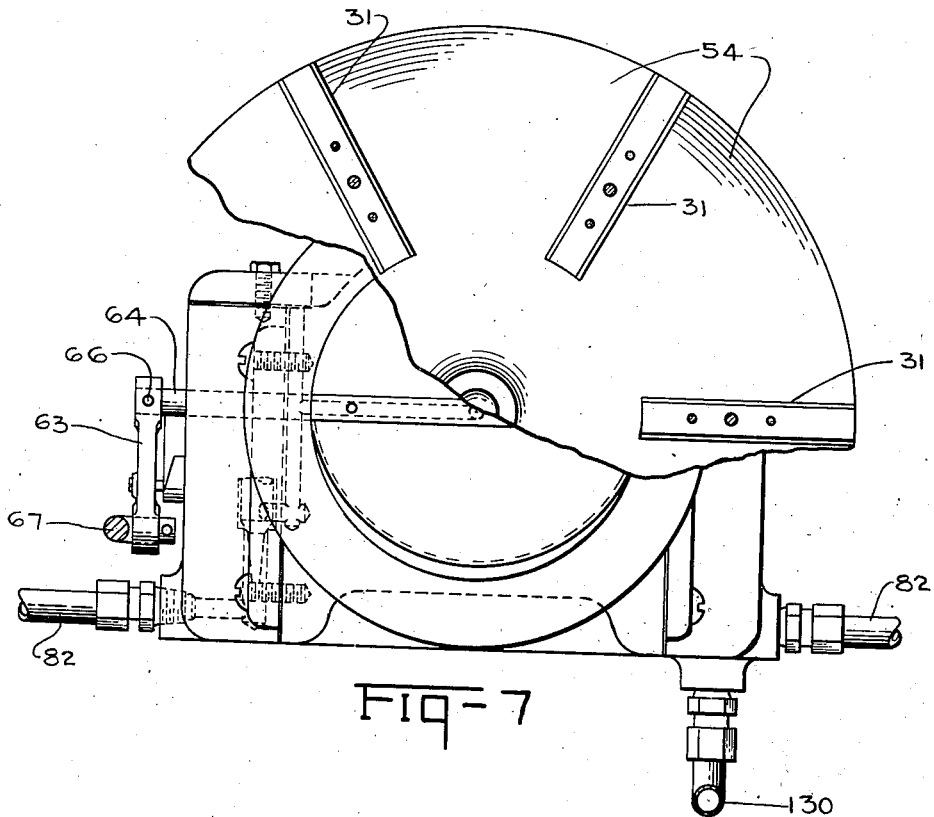
Figure 7 is a front view of the arrangement of my invention, part of the housing being broken away for purposes of illustration.
Figure 8:
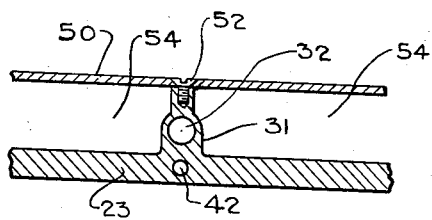
Figure 8 is a sectional view taken substantially on the line 8—8 of Figure 4.

When the throttle arm 63 is in the position shown in Figure 12, the extremity of the plunger 125 will rest in the recess 121, and in this position the throttle valve 62 is in partially open or idling position. In this position the valve shaft 77 is adjusted so that the valve 78 is open or above valve seat 76 to permit passage of fuel required for idling of the engine. In the event that it is desired to shut off the engine, the throttle lever 63 is further moved in a clockwise direction, as viewed in Figure 2, until the fuel metering valves 78 are completely closed, thus cutting off the fuel supply to the rotor 23. In this position of the throttle lever 63 the plunger 125 is in engagement with the angularly positioned surface 122, and under the influence of the spring 126 acting against plunger 125, the throttle arm 63 is held in its extreme left-hand position as viewed in Figure 2, the pressure of spring 126 resiliently urging the fuel metering valves to closed position. It is to be understood that comparatively slight pressure exerted upon the throttle arm through the rod 67 will be sufficient to overcome the tension of spring 126 when it is desired to move the throttle control away from idling position.

Figure 3:
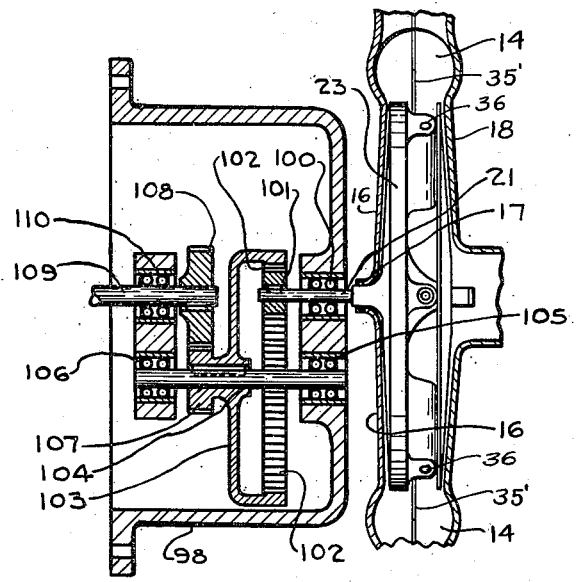
Figure 3 is a vertical sectional view illustrating a means for driving the rotor structure of the fuel and air mixing and distribution arrangement of my invention.

It is essential that the rotor of the arrangement of my invention for most engine installations should rotate at a speed considerably above engine crankshaft speed. In the embodiment illustrated, with particular reference to Figure 3, I have illustrated a form of gearing for rotation of the supercharger disk at approximately eight times engine crankshaft speed, which I have found to be a desirable operation speed for the rotor. The gearing is suitably contained in a housing 98 and, in the present embodiment, is positioned between the supercharger and the engine. The shaft 21 carrying the rotor disk 23 is supported upon suitable anti-friction bearings 100, and on the extremity of the shaft is fixed a gear 101 meshing with an internal gear 102 of larger diameter. The gear 102 is formed on a spider 103 which is carried upon a shaft 104, the latter being journalled on suitable anti-friction bearings 105 and 106. Also formed upon the spider 103 is a comparatively small gear 107 in mesh with a larger gear 108, the latter being supported upon a shaft 109 carried in suitable anti-friction bearings 110. The shaft 109 may be an extension of the engine crankshaft or may be directly connected thereto. Thus it is to be noted that shaft 21 carrying the rotor disk will rotate at a speed substantially eight times the rotation of shaft 109 through the medium of the gearing above described. It is to be understood that while I have shown mechanical means for driving the supercharger rotor at a comparatively high speed, that other means may be employed for this purpose as for example, a hydraulic turbine or an electric motor without departing from the spirit of this invention.

It is highly desirable to provide means for facilitating cold starting and initial running of the internal combustion engine with which the supercharger and fuel mixing device of my invention may be used, and to this end there is provided means to pre-heat a supplemental fuel supply admitted to the engine. This arrangement as particularly shown in Figures 13 and 14 is inclusive of fuel supply tube 130 communicating by means of a passage 132 with a vertically disposed bore or passage 133 formed in valve housing 80 in which is slidably positioned a metering pin or valve 134. The metering pin 134 is tapered and adapted to rest in a valve seat 135 functioning to close the supply of fuel through the supplemental fuel metering means. The valve shaft 136 carrying valve 134 is provided with a collar 138. Journalled in the valve housing is a short shaft 139 which is provided with a cam or arm 140 which projects beneath the collar 138. The shaft 139 projects exteriorly of the valve casing, and upon the projecting end is pinned or otherwise secured an actuating arm 141 and connected to the extremity of the arm is an actuating shaft or rod 143 which extends to the operator's compartment and terminates in a manipulating button (not shown) functioning as a control means. Positioned above the valve rod or shaft 136 is a comparatively light expansive coil spring 145 which exerts slight pressure upon the valve shaft 136 tending to urge the valve 134 toward closed position. When the valve 134 is in closed position and the arm 141 moved to its extreme clockwise position as view in Figure 13, slight clearance exists between the upper surface of the cam 140 and the lower surface of collar 138 in order that the spring 144 may maintain the valve in full closed position.

Communicating with the passage in which the valve 134 is positioned is a transversely extending passageway 145 leading into a heating chamber 146 which functions to preheat the fuel before its exit into the main air stream. Positioned within the heating chamber is an electrically heated element 147 which may be in the form of a resistance coil of an alloy known as Nichrome, one end of which is grounded to the valve housing as at 148, while the other end is connected as by welding at 149 to a post 150 which is surrounded by an insulating bushing 151 of Bakelite or similar material. The heating element 147 is surrounded by a sleeve 153 made of suitable ceramic or other material having both heat and electrical insulating characteristics. The sleeve 153 is provided with an opening 154 which communicates with a passageway 155, the latter in turn being in communication with a passageway 156 formed in a rib or strut 68 extending across the main air inlet and terminating in the main fuel jet 70 extending into the axially positioned venturi 27 arranged in the hub of the supercharger rotor 23.

The post 150 terminates in a threaded portion 159 which receives the end of a conductor 160 held in place by means of nuts 161 and 162 and which is connected to a terminal 163 carried by a switch housing 164, the latter being supported upon the valve casing 80. The other terminal 166 carried by the switch housing 165 is connected to a source of electrical current as for example, a storage battery or generator or the like (not shown) to supply a current of electricity to the heating element 147.

The switch housing 164 houses a suitable switch mechanism including a stationary contact 169 and a movable contact 170 carried by a pivotally supported arm or lever 168 which has projections 172 and 173 alternately positioned in the path of the end of arm 141. With particular reference to Figure 13, it will be noted that when the arm 141 is moved to its extreme clockwise position, it has engaged with projection 173 of the switch lever 168 to separate the contacts 169 and 170 to de-energize the heating element 147 at the time the valve 134 is moved to closed position. When shaft 143 is withdrawn to oscillate arm 141 in a counter-clockwise direction, the arm 141 engages projection 172 on the switch lever to oscillate the latter and effect a closing of the contacts 169 and 170 to energize the heating element 147 when valve 134 is opened. The switch lever 168 is held in its respective "open" and "closed" positions by means of a spring 174.

The operation and function of the arrangement and method of mixing fuel with air and distributing same is as follows: The internal combustion engine 10 is first started by conventional means. At the time of starting the engine the rod 143 and arm 141 are moved to a position by the operator to bring the cam 140 into contact with the collar 138 on the valve shaft 136 elevating the latter to raise the valve 134 off of valve seat 135, at which time fuel may pass through the fuel passage 145 through the heating chamber 146 and through passages 155 and 156 to the main fuel discharge nozzle. Simultaneously with the movement of arm 141 to fuel valve opening position, the arm 141 contacts with the projection 173 on the switch lever 168 to close contacts 169 and 170 energizing the electrical circuit through conductor 160, post 150 and heating element 147, causing the heating element to become heated. The engine in operation rotates shaft 109, and through the medium of the gearing as hereinbefore described shown in Figure 3, rotates the rotor 23 of the supercharger structure at a comparatively high speed. The high speed of rotation of rotor 23 sets up through centrifugal action, radial forces acting in passageways 32, 42 and 54 and venturis 36, establishing an outward air flow radially of the rotor 23 which enters the inlet 61. Under the influence of the centrifugal force, air enters the inlet 61 and with the air valve 62 open the air passes valve 62, some of the air passing radially of the rotor through passageways 32 and 54 under the influence of the curved surface 56 and forces the air radially and outwardly of rotor 23. Some of the incoming air passes through the axially arranged venturi 27 in the hub of the rotor structure and exerts a sub-atmospheric pressure upon the fuel nozzle 70 which terminates in the restricted portion 46 of this venturi. The aspirator action of the rotor 23 causes fuel to be elevated through the fuel supply tube 130 past the valve 134, the fuel flowing through the heating chamber 146 is heated by the element 147 and the heated fuel discharged through the main nozzle into the axially arranged venturi 27 formed in the supercharger rotor. After the internal combustion engine has become warm or has passed through the initial starting stages, the needle valves 79 may then be opened so that the sub-atmospheric pressure set up by the venturi 46 acting upon the fuel delivery jet 70 exerts a sub-atmospheric pressure in the fuel passageways 69, 72, 73, 75, 81 and the fuel supply tube 82 so that liquid fuel is thereafter caused to be lifted by said sub-atmospheric pressure through the above mentioned passageways past the valve seats 76 and needle valves 79 so that fuel is delivered through nozzle 70 and is mixed with air passing through the Venturi throat 46 into the Venturi exit passage or chamber 43 positioned centrally of the hub of rotor 23. Upon the opening of the main fuel metering valves 79 the supplemental fuel supply may be cut off by closing the valve 134 and simultaneously breaking the circuit to the heating element 147 through the action of the switch lever 168. The venturi 27 serves a two-fold purpose, to lift or elevate the fuel from the supply tank to the nozzle and at the same time provide the first stage of mixing air with the liquid fuel discharged from the nozzle 70. Under the action of centrifugal force the mixture of air and fuel in the Venturi passage 43 is discharged radially through passages 42 in the rotor and through the transverse passages 40 to the groove 38 in the Venturi fitting 33 through the openings or passages 39 into the restricted throat portions 37 of these venturis where the fuel and air mixture initially taken into the chamber 43 of the venturi 27 is further mixed in a second stage with air passing outwardly and radially through the passages 32 and venturis 36 where the fuel mixture is further diluted with air as it is discharged peripherally of the supercharger rotor 23. It is to be noted that during rotation of the rotor a substantially large quantity of air unmixed with fuel is discharged radially of the rotor through the passageways 54 formed between the inner walls of the rotor 23 and the closure plate 50, which passageways also discharge air into the annular collector ring or manifold chamber 14 formed peripherally of the rotor disk so that as the fuel and air mixture is discharged into the collector ring from the Venturi tube 36, the mixture is further substantially diluted with air passing through the passages 54 constituting a third stage in forming a fuel and air mixture for final distribution into the engine cylinders through the manifolds or tubes 12 shown in Figure 1. The action of the supercharger in breaking up the liquid fuel is that of an aspirator, as the fuel particles are subjected to extremely high velocities in passing through the passages in the rotor structure. By this means a lifting of the fuel from the fuel supply is accomplished without any independent pumping means and a high degree of atomization of the liquid fuel is accomplished through the three stages of mixing the fuel with air as it passes through the several passages in the supercharger rotor 23. I have found that the arrangement of my invention will atomize very heavy fuels and has the particular advantage of atomizing or carbureting fuels which heretofore could not be carbureted or atomized by the conventional carburetion means. Thus I have found that my arrangement will satisfactorily atomize a fuel known as "High flash" or "Safety" fuel which is very desirable for use in aviation engines and especially those employed in places used for war purposes as this fuel will not take fire readily in bulk liquid form, and is rendered readily combustible only when it is finely divided or atomized and mixed with air.

The arrangement of anterior air and throttle control for the combined supercharger, aspirator and fuel lifting device connected with a metering or valve means for regulating the amount of liquid fuel discharged from the nozzle 70 is in proportion to the amount of air passing the air regulating valve 62. Thus, when the rotor shaft 64 is rotated in a clockwise direction as viewed in Figures 4 and 5, the rotation of shaft 64 and the sector 93 secured thereto elevates sleeves 87, valve shafts 77 formed with the tapered needle portions 79 thereof to admit proportionately more fuel to the nozzle 70 as more air is admitted past the air valve 62. This proportion of fuel to be mixed with the air is established by means of the amount of taper imparted to the needle valve portion 79 of the valve shaft structure 77. It will thus be apparent from Figure 4 that the higher shaft 77 is elevated the more fuel may pass the needle portion 79 through passage 75. By the use of the control of the anterior air valve 62 before the fuel is mixed with the incoming air, I have eliminated the tendency of the throttle to become "frozen" as the plane reaches high altitudes and correspondly low temperatures because of admitting the fuel to the air as it passes the throttle or regulating valve.

I have also found that the fuel being atomized so rapidly by the centrifugal means, that some of the fuel is volatilized into gaseous condition thereby, and this action requires the absorption of substantial amounts of heat to supply the latent heat of vaporization necessary to volatilize the fuel. As the fuel flows through the passages in the rotor 23 at such a rapid rate, it acquires a substantial amount of heat from the rotor structure so that even though the rotor structure is positioned very close to the engine and therefore subjected to the heat of combustion occurring in the engine cylinders, in addition to the heat generated by it at a high speed, the rotor remains at a comparatively low temperature because of the heat absorbed therefrom by the fuel to supply the heat required for vaporization.

From the foregoing, it will be seen that the arrangement of my invention performs many functions in that the arrangement lifts or elevates the fuel direct from a fuel supply tank and through several stages, atomizes and mixes the fuel with air and delivers this fuel and air mixture direct to the engine cylinders through the manifolds under substantial pressures set up by the centrifugal force of the rotor 23 and the arrangement of fuel and air passages therethrough. It is to be understood that the system and apparatus of my invention, while having particular utility with engines of the aviation type because of the peculiar and rapidly varying conditions under which such engines operate, may be used with any type of engine or in any place where liquid and gas mixtures are to be formed.

It is apparent that, within the scope of the invention, modifications and different arrangements may be made other than is herein disclosed, and the present disclosure is illustrative merely, the invention comprehending all variations thereof.

What I claim is:

1. A fuel system for internal combustion engines, comprising in combination, a rotor having an axially arranged venturi; means for supplying fuel to said venturi; said rotor having a plurality of radially arranged ducts, said radially arranged ducts having communication with said axially arranged venturi, and means set up by the rotation of said rotor for passing air through said venturi and inducing the discharge of fuel into said venturi.

2. A fuel system for internal combustion engines, comprising in combination, a rotor, a venturi axially arranged in said rotor; means for supplying fuel to said axially arranged venturi; said rotor having a plurality of radially arranged venturis, said radially arranged venturis having communication with said axially arranged venturi; and means set up by the rotation of said rotor for inducing the flow of air and fuel through said venturis.

3. A fuel system for internal combustion engines, comprising in combination, a rotor having an axially arranged venturi, said rotor being constructed and arranged whereby during rotation thereof air is moved axially of said venturi; means for introducing fuel into the air stream passing through said venturi; said rotor having a plurality of spaced radially arranged venturis in communication with said axially arranged venturi whereby fuel and air mixture formed in said axially arranged venturi is further mixed with air in said radially arranged venturis; said rotor having radially arranged spaced air passages whereby said fuel and air mixture discharged from said radially arranged venturis is further mixed with air passing through the air passages in said rotor; and a zone adjacent the periphery of said rotor for collecting and distributing the fuel and air mixture.

4. In a device of the character disclosed, in combination, a rotor having a chamber in the hub portion, a plurality of radially arranged ducts in said rotor in communication with said chamber; means for supplying air to said chamber; means for supplying fuel to said chamber; means for regulating the flow of air to said chamber; and means interconnected with said air regulating means for metering the fuel supplied to said chamber, each of said radially arranged ducts having a venturi associated therewith and arranged to receive from said chamber a mixture of fuel and air, the collecting zone adjacent the periphery of said rotor arranged to receive air and fuel from said radially arranged venturis in said rotor.

5. In a fuel system for internal combustion engines in combination, a rotor having an axially arranged passage, said rotor having a plurality of radially arranged ducts in communication with said axially arranged passage; means for supplying air to said axially arranged passage; means for supplying fuel to said axially arranged passage; means for regulating the flow of air to said passage; and means intercolated with said air regulating means for metering the fuel supplied to said passage, said rotor having radially arranged air passages, each of said radially arranged passages having a venturi therein arranged to receive from said axially arranged ducts a mixture of fuel and air; a collecting zone surrounding the periphery of said rotor arranged to receive air and fuel from said radially arranged venturis and to receive air from said radially arranged air passages.

6. In a device of the character disclosed in combination, a rotor having a chamber in its hub portion and radially arranged passages communicating with said chamber; means for admitting air to said chamber; a fuel supply nozzle for discharging fuel into said chamber; metering means for controlling the fuel discharged from said nozzle; means for regulating the flow of air to said chamber; a supplemental fuel supply means for delivering fuel to said nozzle from said supplemental fuel supply; electrical means for heating said supplemental fuel supply; and means for regulating the flow of fuel to said nozzle from said supplemental fuel supply means.

7. A fuel system for internal combustion engines comprising in combination, a rotor having a hollow hub portion, means for rotating said rotor whereby air is moved axially of the hollow hub portion, means for introducing fuel into the air stream passing through the hollow hub portion, said rotor having a plurality of radially arranged ducts in communication with said hollow hub portion, said rotor having a series of radially arranged passages, said rotor having lateral passageways connecting said radially arranged ducts with said radially arranged passages whereby the fuel and air mixture in said ducts is discharged into said radially arranged air passages in said rotor.

8. A fuel system for internal combustion engines, comprising a combination, a rotor, means to rotate said rotor at a high rate of speed, said rotor having a hollow hub portion with an axially arranged venturi formed therein, means for supplying fuel and air into said venturi, said rotor having a plurality of radially arranged ducts communicating with said venturi, said rotor having a series of radially arranged passages adjacent said ducts, said ducts and said passages being connected by laterally arranged passageways, means to admit air to said radially arranged passages whereby the fuel and air mixture in said ducts is discharged into said passages for further diluting the fuel and air mixture discharged peripherally of said rotor from said radially arranged passages.

OTIS C. FUNDERBURK.